United States Patent [19]

Beard

[11] Patent Number: 5,631,539
[45] Date of Patent: May 20, 1997

[54] PROCESS AND APPARATUS FOR CHARGING LITHIUM CELLS OR THE LIKE

[75] Inventor: Paul Beard, Milpitas, Calif.

[73] Assignee: Norand Corporation, Cedar Rapids, Iowa

[21] Appl. No.: 328,250

[22] Filed: Oct. 24, 1994

[51] Int. Cl.$^6$ ............................................. H01M 10/44
[52] U.S. Cl. ........................... 320/22; 320/30; 320/31; 320/32; 320/39
[58] Field of Search ........................... 320/21, 22, 23, 320/24, 30–34, 39–40, 25–26, 43–45, 48, 13, 14, 15, 9

[56] References Cited

U.S. PATENT DOCUMENTS

| | | | |
|---|---|---|---|
| 4,052,656 | 10/1977 | Lavell et al. ........................... | 320/23 |
| 4,388,582 | 6/1983 | Saar et al. . | |
| 4,392,101 | 7/1983 | Saar et al. . | |
| 4,583,034 | 4/1986 | Martin ........................... | 320/21 |
| 4,670,703 | 6/1987 | Williams ........................... | 320/22 |
| 4,679,000 | 7/1987 | Clark ........................... | 320/44 X |
| 4,709,202 | 11/1987 | Koenck et al. ........................... | 320/43 |
| 4,885,523 | 12/1989 | Koenck . | |
| 4,965,738 | 10/1990 | Bauer et al. ........................... | 320/39 X |
| 5,043,650 | 8/1991 | Bhagwat et al. ........................... | 320/39 |
| 5,122,722 | 6/1992 | Goedken et al. ........................... | 320/22 |
| 5,321,627 | 6/1994 | Reher ........................... | 320/43 X |
| 5,325,041 | 6/1994 | Briggs ........................... | 320/44 |
| 5,341,082 | 8/1994 | Lorenzen et al. ........................... | 320/40 X |
| 5,396,163 | 3/1995 | Nor et al. ........................... | 320/21 |
| 5,463,305 | 10/1995 | Koenck ........................... | 320/21 |

*Primary Examiner*—Peter S. Wong
*Assistant Examiner*—K. Shin
*Attorney, Agent, or Firm*—Suiter & Associates PC

[57] ABSTRACT

A process for charging one or more lithium containig electrochemical cells which exhibit a plurality of characteristics with respect to time while either being charged with or while discharging energy, wherein the charging process includes an unpetrify phase, a fast phase, a top up phase, a done phase, a good phase, and a low phase.

11 Claims, 3 Drawing Sheets

1

PROCESS AND APPARATUS FOR CHARGING LITHIUM CELLS OR THE LIKE

TECHNICAL FIELD

The present invention relates generally to battery charging systems and more specifically to a process of charging lithium ion rechargeable batteries.

BACKGROUND ART

Methods of charging and recharging batteries comprised of rechargeable cells are well known in the prior art. There exist several different varieties of rechargeable cells commonly used, such use depending upon the current draw requirements of the particular devices to be powered. Many of the methods for determining charge termination typically rely on voltage-sensing alone, cutting off or changing the rate of charging when the voltage at the terminals of the battery has reached a predetermined value, often compensating the voltage cutoff values for variations in the ambient temperature. Other exotic techniques, such as employed Saar, U.S. Pat. No. 4,392,101 examine the second derivative of the battery voltage with respect to time in order to predict internal electrochemical changes within the cell and control the method of charging. Some techniques simply rely on the passage of charging time alone. However, none of the techniques taught in the prior art describe a method of simultaneously monitoring voltage, current, and time to determine the charge condition of a lithium type cell. Further, no technique in the prior art teaches monitoring the direction of current flow to determine whether the cell is sourcing or sinking current, thus charging or discharging energy, to analyze the state of charge of the cell.

Electrochemical cells do not charge linearly over the duration of the charging process. Due to the chemical characteristics of the particular elemental combinations used for storing electrical energy as chemical energy, a cell passes through a series of states of varying electrical behavior as observed from the terminals of the electrochemical cell. In general, electrochemical cells draw higher amounts of current when charging from a state of low potential energy than when charging from a higher state of potential energy when nearly fully charged. The electrochemical cell exhibits variations in voltage as well, correlating to the changing current draw as energy is delivered into the cell.

Current rechargeable battery systems employ either nickel-cadmium or lead-acid cells, which perform well in most applications, but these cells have certain disadvantages when it comes to portability. For a given amount of charge capacity, these cells are relatively heavy. Demand for batteries with higher energy densities at lower costs is fueling the search for alternatives to nickel-cadmium and lead-acid cells. Nickel-metal hydride cells have greater energy density than nickel-cadmium cells, resulting in longer operating times, but are also more expensive. Zinc-air cells offer greater energy densities as well, but cannot be charged too rapidly and have shorter operational lifespans. Lithium cells are well suited to applications requiring low current draw for extended periods of time, and are inexpensive. The problem with lithium cells is that the cell may explode if overcharged due to the instability of pure lithium metal.

Because of the volatility of cells manufactured from pure lithium metal, battery manufacturers are developing variations of lithium cells in order to reduce the dangerousness of pure lithium. Lithium-ion cell technology utilizes a metal-oxide alloy at the anode, the positive electrode, and a carbon based structure at the cathode, the negative electrode. The two electrodes are separated by an organic electrolyte wherein lithium-ions flow from one electrode to the other producing the electrochemical reactions for storing or discharging energy. Another variation of the lithium based cell is the lithium polymer cell in which the anode is composed of a metal-oxide alloy and the cathode is composed of a lithium-metal foil. The main difference between the lithium-ion cell and the lithium polymer cell is that the electrolyte is composed of a solid polymer rather than a liquid as in the lithium-ion cell.

Consideration of the charging characteristics of the lithium-ion cell is important for maximizing the amount of energy the cell will hold, and to prevent overcharging. Additionally, faster charging times to peak cell capacity may damage the cell if overcharging occurs. As the cell becomes overcharged, the voltage it is capable of producing will decrease. In general, electrochemical cells also exhibit hysteresis characteristics, or memory effect, such that when a cell is not fully discharged before being recharged, the cell, after being fully charged from the intermediate charge state, will discharge only to the previous charge level, eventually causing the cell to prematurely reach the end of its useful life. The same may occur with overcharged cells because the output voltage of the cell decreases when charged beyond maximum capacity. Thus, the process of recharging lithium cells must account for the electrochemical behavior of the lithium cell.

It is therefore an object of the invention to implement an improved method and apparatus for charging lithium cells.

It is another object of the invention to determine the charge condition of a lithium battery.

It is a further object of the invention to apply the appropriate charging techniques to a lithium battery based upon the determined charge condition.

Another object of the invention is to allow the charging process to accommodate variations in lithium cell fabrication.

DISCLOSURE OF THE INVENTION

A process for charging one or more electrochemical cells containing lithium and which exhibit a plurality of characteristics with respect to time while either being charged with or while discharging energy. In its complete form the charging process includes an unpetrifing phase, a fast phase, a top up phase, a done phase, a good phase, and a low phase. Also described is an apparatus operating according to the described process.

DESCRIPTION OF AN EXEMPLARY EMBODIMENT

Figure 1:
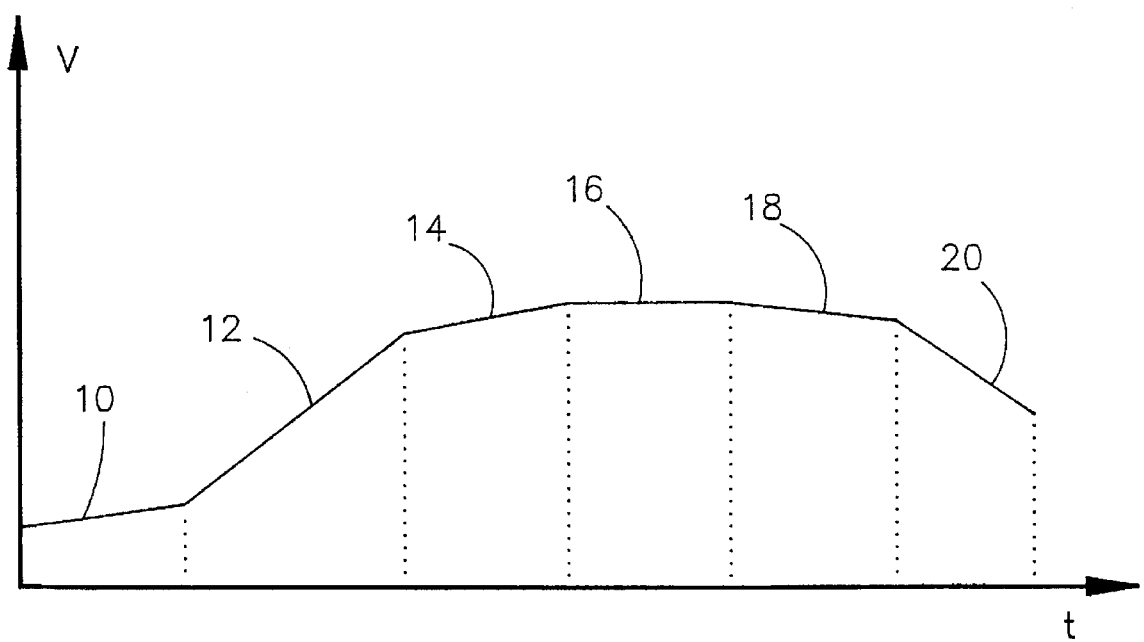
FIG. 1 is an illustration of the voltage across the terminals of a lithium cell versus time and the corresponding states of charge.
Figure 3:
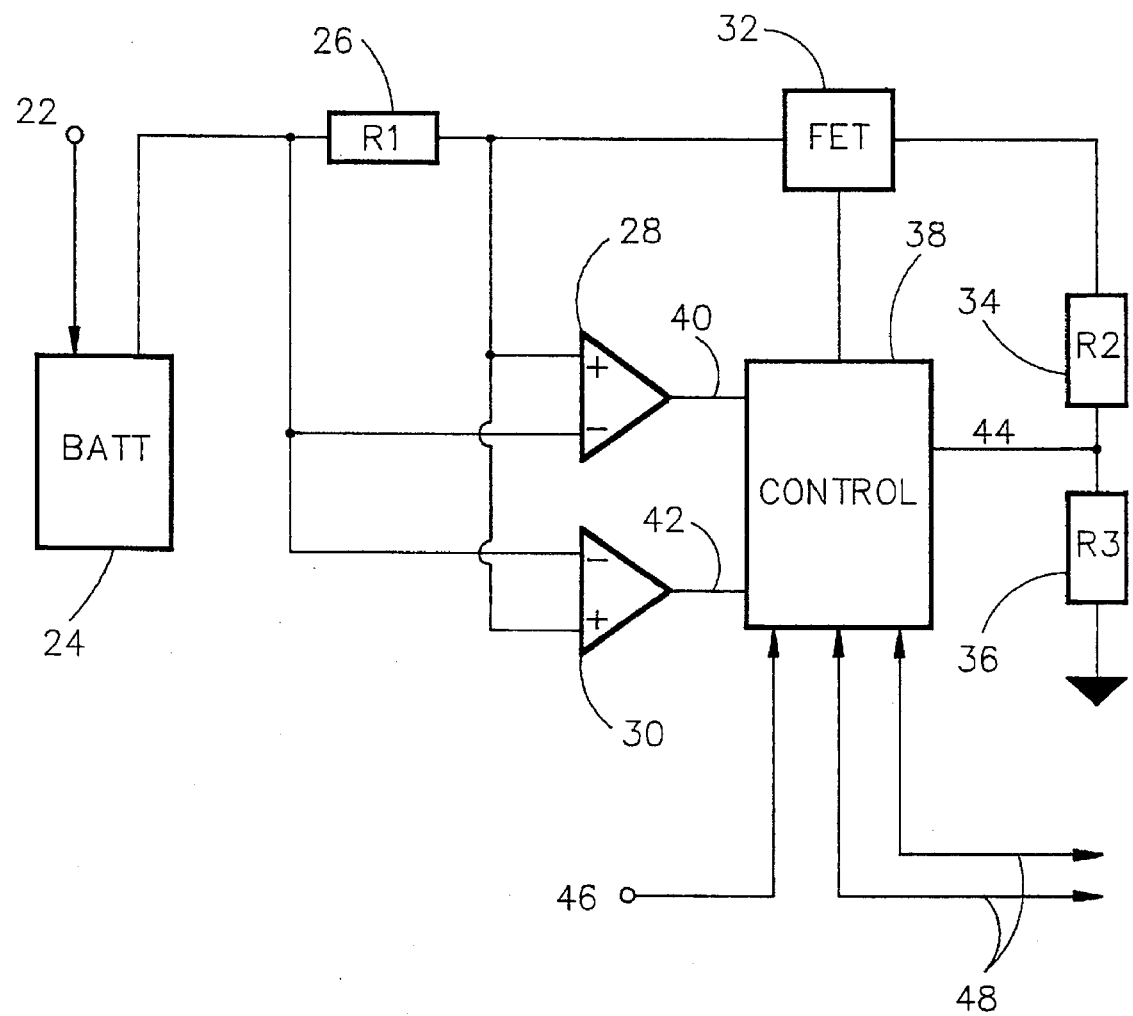
FIG. 3 is a schematic diagram of the electronic circuitry of the invention.

FIG. 1 shows the phases through which the lithium battery 24 ("BATT"), shown in FIG. 3, passes as it is charged. The phases may be described in terms of the voltage seen across the terminals of the battery 24 as the battery 24 is being charged or recharged. Additionally, other characteristics of the lithium battery 24 are monitored simultaneously to determine the current state of charge, including current draw and time. No regard to temperature is necessary because temperature controlled charge cutoff methods are imprecise and difficult to implement.

One problem encountered with temperature controlled charging systems is that the coefficient of the overcharge voltage does not remain constant but varies with cell design and rate of charge. When a cell begins to overcharge, oxygen is generated internally causing an increase of the internal pressure. Additionally, the oxygen reacts exothermally with the cathode material in a recombination rate determined by the pressure within the cell, the electrolyte level, the reactivity of the cathode, and the internal cell temperature. The temperature of the cell is in turn a function of the recombination rate of the oxygen and of the heat dissipation ability of the cell itself. Because these factors affecting the temperature of the cell occur internally therein, they are difficult to detect and to program into the charging system. It is for the above reasons and because other methods for determining charge cutoff are more reliable that no regard to temperature is made by or is required with the present invention.

Initially, the lithium-ion battery 24 is in a state of discharge wherein the voltage is low and undetermined. When the battery 24 is charged from its initial condition, it is unpetrified 10 until it reaches a minimum voltage at which point fast charging 12 of the battery may commence. Upon reaching a voltage near maximum charge, the battery may then be topped up 14 with a slower charge rate, or trickle charge, until the battery 24 has reached maximum charge. When maximum charged has been reached, the battery is done charging 16 and may still draw charging current. While the voltage is greater than a given voltage, the energy level in the battery 24 is still good 18. When the voltage in the battery falls below that given voltage, then energy in the battery 24 is low 20.

Figure 2:
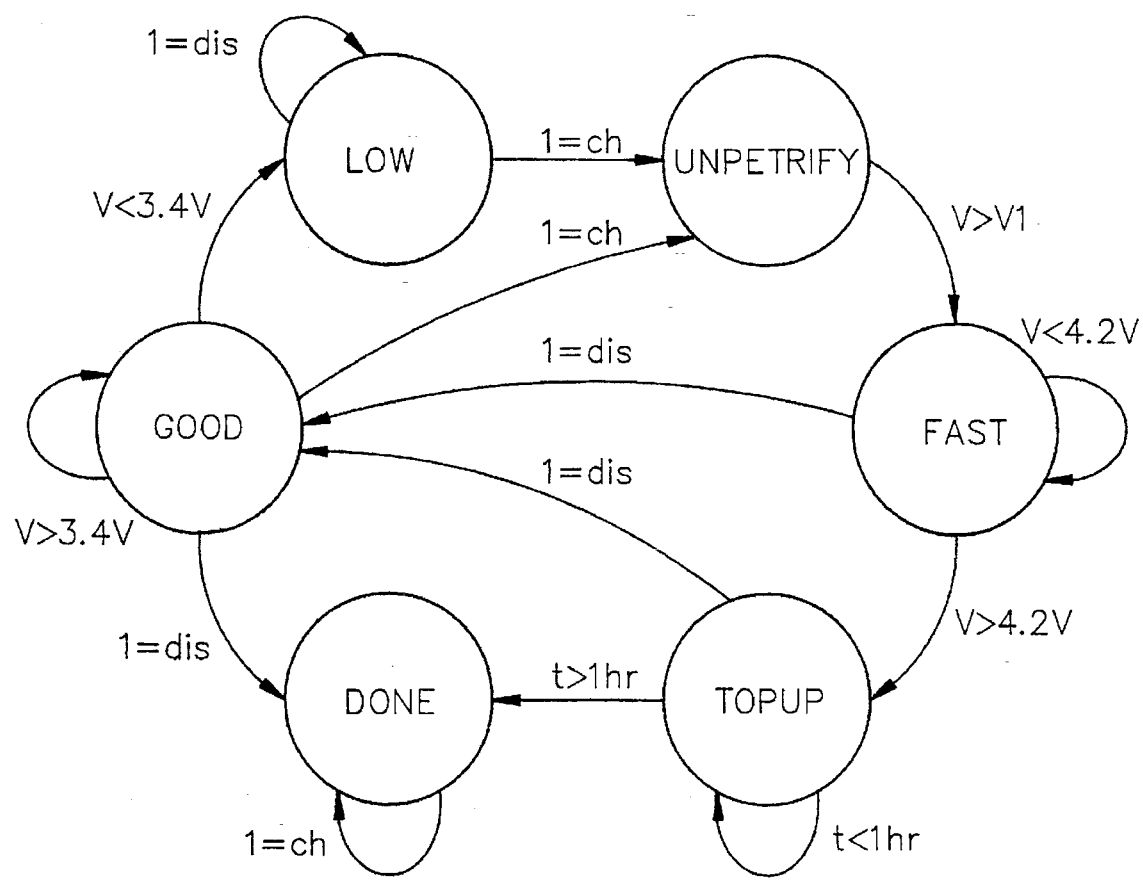
FIG. 2 is a depiction of the charging state diagram portraying the interrelationship between the charge states of the invention.

FIG. 2 depicts the state diagram resulting from the above given description of the multiple phases through which the battery passes. These states describe which phase the battery 24 is in and under what conditions the battery will change states or remain in the current state. From the state diagram in FIG. 2 the conditions for transition from one phase to another are readily determined. The state diagram of FIG. 2 illustrates the logic upon which the invention operates to control the charging process.

The battery 24 is initially unpetrified ("UNPETRIFY"). Upon reaching a predetermined minimum voltage, V1, fast charging ("FAST") of the battery 24 begins. So long as the voltage remains less than the nominal voltage of full charge, the fast charging of the battery 24 continues. In an exemplary embodiment, the nominal voltage is 4.2 volts. When the voltage of the battery 24 is greater than 4.2 volts, the battery 24 continues to charge at a slower rate until it is topped up ("TOP UP"), so long as the battery is not discharging current. If the battery begins to discharge current during the fast charge phase, then the energy of the battery 24 is good ("GOOD") and the battery 24 is not topped up.

If the battery 24 begins to discharge current during the TOP UP phase, then the energy of the battery is good. Otherwise the battery 24 continues to be topped up so long as the time of charging is less than a given period of time, which is one hour in a currently preferred embodiment of the invention. After charging time has surpassed one hour, the battery 24 is done charging ("DONE"). So long as the battery continues to charge, a small charge current is applied to maintain the charge in the battery 24.

If the battery 24 is discharging current while in the good phase, then the battery is done charging. The energy in the battery 24 is good so long as the voltage of the battery remains greater than a minimum operational voltage. In an exemplary embodiment, the minimal operational voltage is 3.4 volts. If current begins to charge the battery 24 from the good phase, then the battery enters the unpetrify phase in order to initiate another charge cycle. If the voltage of the battery 24 falls below 3.4 volts, the energy in the battery is low ("LOW"). So long as the battery continues to discharge current, it remains in the low phase. Once the current in the battery 24 is charging, the battery is in the unpetrify phase and the charging cycle begins anew.

FIG. 3 depicts the schematic diagram of en exemplary circuit implementation of the present invention. The anode of the battery 24 ("BATT") connects to the positive terminal 22 of a regulated voltage 23 ("REGULATOR") which provides the energy with which the battery 24 is charged. In an exemplary embodiment, the regulated voltage 22 is a 15 volt output of a voltage regulator. The cathode of the battery 24 connects in series to the rest of the charging circuitry through a current sensing resistor 26 ("R1").

The current-sensing resistor 26 directly connects in parallel between the inverting and the non-inverting inputs of a current magnitude detecting operational amplifier 28 and a current sign-detecting operational amplifier 30. The current magnitude-detecting operational amplifier 28 detects the current flowing through the current-sensing resistor 26 and sends the current magnitude signal to the microcontroller 38 ("CONTROLLER"). The analog output 40 of the current-detecting operational amplifier connects to the controller wherein it is converted to a digital discrete-time function that may be processed by the controller 38.

The analog output 42 of the current sign-detecting operational amplifier 30 also connects to the controller 38 undergoing conversion to a discrete-time function as well. The current sign information communicates to the controller 38 whether the battery 24 is charging or discharging. The sign of the current flow changes upon a change in direction of current flow indicating whether electric charge is flowing into or out of the battery 24.

A field-effect transistor 32 (FET) connects between the current-sensing resistor 26, the controller 38, and the voltage-sensing resistors 34 ("R2") and 36 ("R3"). The voltage-sensing resistors 34 and 36 connect in series to ground, connecting further to the controller 38, which connects to the node 44 between the two voltage-sensing resistors. The field-effect transistor 32, preferably a p-channel field-effect transistor, functions as a switch to turn-on or turn-off the charging of the battery 24. When the controller turns on the field-effect transistor 32, a complete circuit is formed and the battery 24 begins charging. When the transistor 32 is off, the circuit is open and the battery 24 does not charge. The controller 38 controls the rate of charging depending upon the particular battery state through appropriate modulation of the transistor 32.

When the battery charger is to detect changes in the voltage of the battery 24, the voltage-sensing mode, the battery is charged with a constant current. In an exemplary embodiment, the value of the constant current is 1 ampere, however the controller may be programmed to charge at varying current values to account for different types of lithium cells. When the battery charger is in the current-sensing mode, the voltage at the terminals of the battery 24 is held at a constant value. In an exemplary embodiment, this value is 4.2 volts, which may also be reprogrammed into the controller to account for different species of lithium cells.

The controller 38 detects the voltage across the battery by reading the voltage at the node 44 between the two voltage-sensing resistors 34 and 35. The voltage at this node correlates to the voltage drop across the terminals of the battery through an analysis of Kirchoff's voltage law around the charging loop, which may be programmed into the controller 38. The voltage at the node 44 between the two voltage detect resistors 34 and 26 is converted to a digital discrete-time function to be processed by the controller 38.

The system clock 50 ("CLOCK") drives the controller 38 through the clock input 46, driving the controller 38 at 500 kHz in an exemplary embodiment. Further communications and control may be accomplished through the two-wire interface 48 to a system coprocessor 52 ("COPROCESSOR").

Thus, there has been described a method and apparatus for charging lithium cells or the like which accomplish at least all of the stated objects.

I claim:

1. A process for charging one or more electrochemical cells wherein one or several of the component parts of said cells are fabricated from lithium or any ion, nuclide, variation, combination, compound or derivative thereof, said cells exhibiting a plurality of characteristics with respect to time while either being charged with or while discharging energy, such process comprising:

(a) an unpetrify charging phase;
   (b) a fast charging phase;
   (c) a top up charging phase;
   (d) a done charging phase;
   (e) a good charging phase; and
   (f) a low charging phase.

2. The process according to claim 1 wherein the unpetrify charging phase includes charging said cells at a predetermined charge rate until a voltage condition is satisfied.

3. The process according to claim 1 wherein the fast charging phase includes charging said cells at a predetermined charge rate until a voltage condition is satisfied.

4. The process according to claim 1 wherein the fast charging phase includes charging said cells at a predetermined charge rate until a current condition is satisfied.

5. The process according to claim 1 wherein the top up charging phase includes charging said cells at a predetermined charge rate until a current condition is satisfied.

6. The process according to claim 1 wherein the top up charging phase includes charging said cells at a predetermined charge rate until a time condition is satisfied.

7. The process according to claim 1 wherein the done charging phase includes charging said cells at a predetermined charging rate so long as a current condition is satisfied.

8. The process according to claim 1 wherein the good charging phase includes charging said cells at a predetermined charging rate until a current condition is satisfied.

9. The process according to claim 1 wherein the good charging phase includes charging said cells at a predetermined charging rate until a current condition is satisfied.

10. The process according to claim 1 wherein the good charging phase includes charging said cells at a predetermined charging rate until a voltage condition is satisfied.

11. The process according to claim 1 wherein the low charging phase includes charging said cells until a current condition is satisfied.

* * * * *